United States Patent [19]
Padwa

[11] Patent Number: 5,905,118
[45] Date of Patent: May 18, 1999

[54] MISCIBLE POLYMERS

[75] Inventor: Allen Robert Padwa, Worcester, Mass.

[73] Assignee: Bayer Antwerpen S.A./N.V., Antwerpen, Belgium

[21] Appl. No.: 09/051,741

[22] PCT Filed: Nov. 3, 1995

[86] PCT No.: PCT/US95/14743

§ 371 Date: Apr. 24, 1998

§ 102(e) Date: Apr. 24, 1998

[87] PCT Pub. No.: WO97/16487

PCT Pub. Date: May 9, 1997

[51] Int. Cl.[6] ............ C08L 25/02; C08L 25/12; C08L 33/12
[52] U.S. Cl. ............ 525/188; 525/190; 525/191; 525/217; 525/219; 525/222; 525/227; 525/238; 525/240; 525/242; 526/336; 526/341; 526/346
[58] Field of Search .................. 525/185, 188, 525/190, 191, 217, 219, 222, 227, 238, 240, 242; 526/336, 341, 346

[56] References Cited

U.S. PATENT DOCUMENTS 3,726,839  4/1973  Jin .
5,237,028  8/1993  Guo et al. ............... 526/278
5,274,050  12/1993  Guo et al. ............... 525/381
5,340,883  8/1994  Guo et al. ............... 525/381

OTHER PUBLICATIONS

Huggard M. T. 1993, new Intumenscent Phosphorus–Based Fire Retardants, Plastics Engineering 49, Nov. 1993, 29.
Wigotsky, V., Flame Retardants, Plast. Eng 49, 10, Oct. 1993, 20.
Chem. Abstracts., vol. 72, No. 4, Jan. 26, 1970, Abstract No. 13116.
Polymer, vol. 35, No. 16, 1994, Lancaster, UK, pp. 3470–3473, M. Banks et al.
Chem. Abstracts, vol. 108, No. 22, May 30, 1998, Abstract No. 187541.
Journal of Polymer Science, vol. 18, No. 7, Jul. 1974, I. Cabasso et al, pp. 1969–1986.
J. Polym. Sci. Polym. Chem. Ed. A 28 (1990) 227; 27 (1989) 3985.

*Primary Examiner*—Nathan M. Nutter
*Attorney, Agent, or Firm*—Joseph C. Gil; Aron Preis

[57] ABSTRACT

Disclosed herein are terpolymers of styrene, acrylonitrile and dimethyl styrene phosphonate and blends thereof with poly(styrene acrylonitrile) polymers and polymers and copolymers of methylmethacrylate.

10 Claims, 1 Drawing Sheet

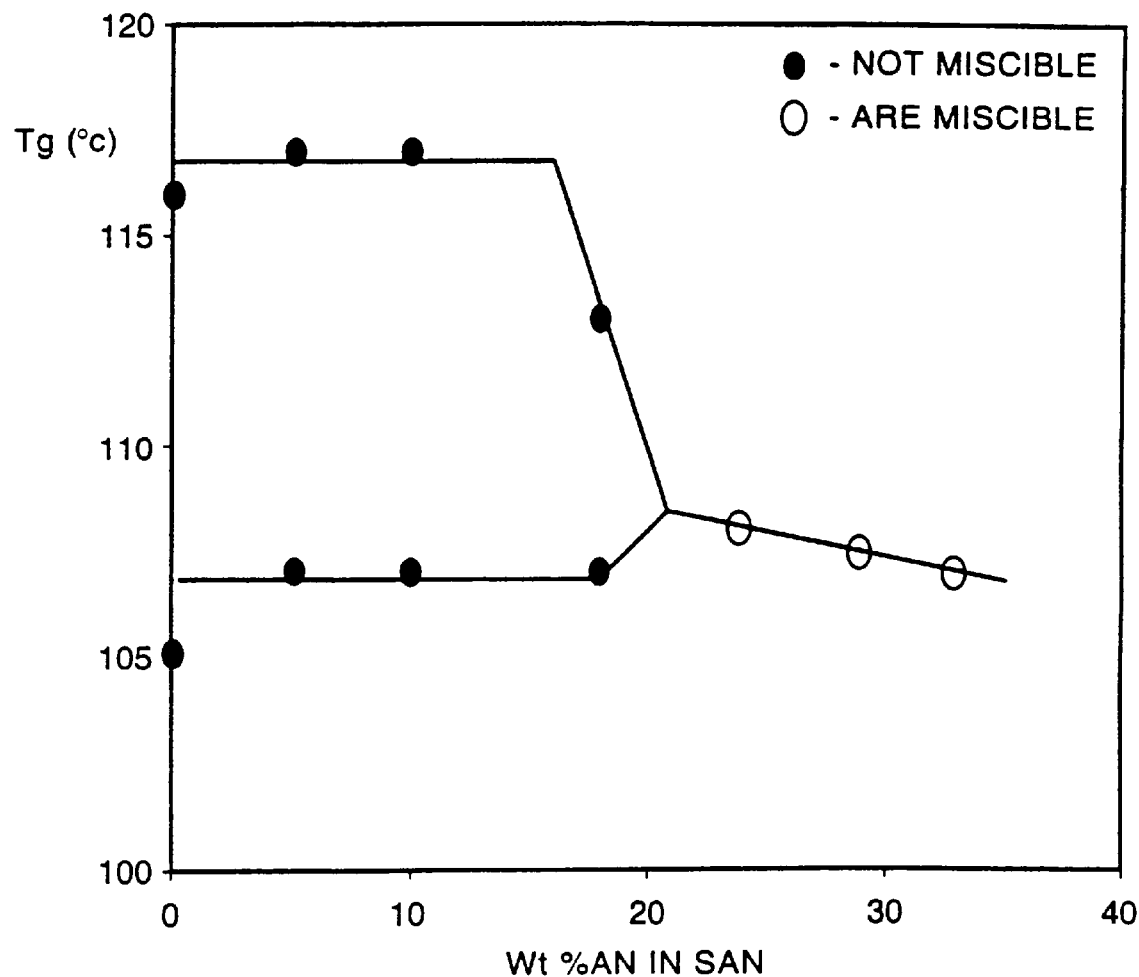

MISCIBLE POLYMERS

This application is a 371 of PCT/US95/14743, filed Nov. 3, 1995.

BACKGROUND OF THE INVENTION

The present invention relates to terpolymers of a vinyl aromatic monomer such as styrene, α-methylstyrene, chlorostyrene and the like; an unsaturated nitrile monomer such as acrylonitrile, methacrylonitrile and the like and a dialkylvinyl aromatic phosphonate and to miscible blends thereof with certain polymers such as poly(styrene acrylonitrile) polymers (SAN) and polymers and copolymers of methylmethacrylate.

FIELD OF THE INVENTION

Terpolymers of styrene (S), acrylonitrile (AN) and dimethylstyrene phosphonate (DMSP) and blends thereof with other polymers such as SAN and polymethylmethacrylate (PMMA).

DESCRIPTION OF RELATED ART

Polymers containing phosphonic acid groups are known in the art. Examples include styrene/1-phenylvinylphosphonic acid copolymers (Plast. Massy, No. 8 (1966)24), crosslinked vinyl phosphonate copolymers (U.S. Pat. No. 3,726,839), and styrenic polymers that contain pendent phosphonate ester groups [J. Polym. Sci. Polym. Chem. Ed. A 28 (1990) 227;27 (1989) 3985].

U.S. Pat. No. 5,237,028, 5,274,050 and 5,340,883 to S. H. Guo and R. A. Grey teach copolymers of a styrene monomer and 1-phenylvinyl phosphinic acid. These copolymers are reacted with a diamine or polyamine to form absorbents for organic liquids.

Phosphorus compounds have been used to impart flame retardance to a number of polymer systems (see Huggard, M. T. 1993, New Intumescent Phosphorus-Based Fire Retardants, Plastics Engineering, 49, 28). In mixtures of polymers such as ABS with main-chain aromatic polymer such as polycarbonate, phosphorous based compounds can impart flame retardance (see Witgosky, V. Flame Retardants, Plast. Eng. 49,10,21).

The incorporation of organophosphorus compounds, while minimizing some of the environmental concerns of halogens, can still result in performance changes due to plasticization and migration. Incorporation of bound phosphorous functional groups into the polymer structure opens up the possibility of new performance regimes.

SUMMARY OF THE INVENTION

Disclosed herein are novel styrenic compositions which contain phosphorous and which are miscible with polymers such as styrene acrylonitrile polymers (SAN) and polymers and copolymers of methylmethacrylate. The novel styrenic compositions comprise at least one vinyl aromatic monomer, at least one unsaturated nitrile monomer and a dialkylvinylaromatic phosphonate. The preferred vinylaromatic monomers are styrene, alphamethyl styrene, vinyl toluene, halostyrenes, e.g. bromo- or chloro-styrene, paramethyl styrene and the like. Most preferred are styrene and alphamethylstyrene. The preferred unsaturated nitrile monomers are acrylonitrile and methacrylonitrile with acrylonitrile being more preferred. The foregoing monomers may also be used to prepare variations of the SAN used in the miscible blends with the phosphorous containing polymer. The preferred alkyls used in the dialkyl phosphonates are $C_1$ to $C_{10}$ alkyls with methyl, ethyl and propyl being preferred. The resulting miscible compositions of the S/AN/DMSP and the SAN components may further contain rubbery polymers such as methylacrylate-butadiene-styrene polymers (MBS), acrylonitrile-butadiene-styrene polymers (ABS), acrylonitrile-styrene-acrylate rubber polymers (ASA), acrylonitrile-styrene-ethylene propylene diene monomer polymers (EPDM-g-SAN) and the like. The phosphorous component contributes to flame retardance while the rubber components impart toughness.

BRIEF DESCRIPTION OF THE DRAWING

The sole drawing is a diagram showing the glass transition temperature ($T_g$) of 50/50 blends of SAN with a S/AN/DMSP polymer as a function of the weight percent of AN in the SAN.

DESCRIPTION OF THE PREFERRED EMBODIMENTS

The S/AN/DMSP polymers of the present invention contain from 40 to 84 weight percent of styrene (S), from 15 to 35 weight percent of acrylonitrile (AN) and from 1 to 25 weight percent of dimethylstyrene phosphonate. Preferably the amount of styrene is in the range of from 50 to 70 weight percent, the amount of acrylonitrile is in the range of from 20 to 30 weight percents and the DMSP is in the range of from 10 to 20 weight percent. All weight percents being based on the total weight of the S/AN/DMSP polymer.

The S/AN/DMSP polymer is prepared by conventional polymerization methods such as emulsion, suspension, solution, bulk or mass techniques. One method of such a preparation is shown in Example 1 below.

EXAMPLES 1 to 11

PREPARATION OF S/AN/DMSP POLYMERS

The DMSP was copolymerized with styrene (S) and/or acrylonitrile (AN). The S and AN used were commercial grade monomers which were purified to remove inhibitor using catechol and quinone removal aluminas, respectively, which aluminas were obtained from Scientific Polymer Products, Ontario, N.Y. The polymerization initiator used was azobisisobutyronitrile (AIBN), reagent grade from Aldrich Chemical.

Monomer and initiator mixtures were sealed under nitrogen in 5 mm glass tubes after freezing the mixtures with dry ice. The initiator concentration was 0.066 wt % except where noted. All polymerizations were carried out without solvent. The contents of the tubes were polymerized at 70° C. for the required time. The subsequent solution of polymer in monomers (about 5 gm) were poured into a tared 50 ml glass centrifuge tube and weighed. The polymer was precipitated with 30 ml of methanol and spun at 5000 rpm. After decanting and drying, in vacuo, at 80° C. overnight, the dry polymer was weighed and used for subsequent analysis. For composition and molecular weight determination, samples of near 1% conversion were chosen.

The composition of the polymer was determined by automated Carlo-Erba C—H—N analysis. Phosphorus content was determined by Galbraith Labs (Knoxville, Tenn.). Molecular weight was estimated by automated size exclusion chromatography in tetrahydrofuran using four columns containing a mixed pore-size bed of 5 μm beads (Polymer Laboratories, Amherst, Mass.) The flow rate was 1 ml min$^{-1}$ at 35° C. with a refractive index detector. Molecular weights were estimated using the universal calibration method and are reported in polystyrene equivalents.

The compositions of the polymers prepared in Examples 1 to 11 are summarized in Table I below.

2-butanone was clear and showed no signs of phase separation. The dried films were observed visually and the phase behavior determined by DSC. The films which exhibited turbidity or cloudiness had two glass transition temperatures ($T_g$s), while the clear films exhibited a single $T_g$.

TABLE I

Terpolymerization of DMSP with Styrene and Acrylonitrile
Effect of Monomer Composition on the Rate of Polymerization, Molecular weight, and $T_g$

| Example | DMSP(1) | AN(1) | DMSP(2) | AN(2) | AIBN (3) | Mn | $T_g$ |
|---|---|---|---|---|---|---|---|
| 1 | 0 | 25.0 | 0 | 18.2 | 0.066 | 190.6 | 108.2 |
| 2 | 0 | 0 | 0 | 0 | 0.066 | 147.3 | 95.5 |
| 3 | 2 | 0 | <5 | 0 | 0.066 | 73.8 | 108.9 |
| 4 | 5 | 0 | 13.1 | 0 | 0.066 | 35.3 | 108.0 |
| 5 | 10 | 0 | 32.3 | 0 | 0.066 | 25.8 | 110.8 |
| 6 | 20 | 0 | 33.4 | 0 | 0.066 | 24.2 | 114.4 |
| 7 | 30 | 0 | 45.1 | 0 | 0.066 | 22.4 | 109.3 |
| 8 | 2 | 24.5 | 4.9 | 20.3 | 0.066 | 101.6 | 111.4 |
| 9 | 5 | 23.8 | 6.2 | 18.1 | 0.066 | 73.6 | 110.6 |
| 10 | 10 | 22.5 | 14.2 | 19.9 | 0.0066 | 56.2 | 116.1 |
| 11 | 17 | 20.8 | 19.7 | 18.8 | 0.0066 | 41.5 | 117.5 |

KEY TO EXAMPLES
(1)—weight % of DMSP and AN in monomer charge
(2)—weight % of DMSP and AN in polymer; wt % of styrene in polymer is by difference
(3)—weight % AIBN in monomer charge
Mn—is number average molecular weight in grams/mole
Example 1—(control) a copolymer of styrene (81.8% by wt) and acrylonitrile (18.2% by wt)
Example 2—(control) a polystyrene homopolymer
Examples 3 to 7—(controls) styrene/DMSP copolymers
Examples 8 to 11—terpolymers of S/AN/DMSP Examples 8 to 11 show the S/AN/DMSP terpolymers of the present invention. In these examples the amount of DMSP in the terpolymer varies from 4.9 to 19.7% by weight based on the total weight of the terpolymer. The amount of AN in the terpolymer varies from 18.1 to 20.3. The amount of styrene is by difference. The $T_g$ of the terpolymers in Examples 8 to 11 generally increases with increasing amounts of DMSP.

EXAMPLES 12 TO 18

These examples illustrate blends of the S/AN/DMSP terpolymer with SAN and with PMMA. The SAN and PMMA polymers used for blending with the S/AN/DMSP copolymers were made by well known polymerization methods.

Polymer blends were prepared by casting a 1:1 (weight/weight) mixture of the S/AN/DMSP and SAN or PMMA polymer as a 5 wt % solution in 2-butanone into warmed (about 75° C.) Petri dishes. After evaporation of the solvent, the film was removed from the glass and dried, in vacuo, at 120° C. overnight. The resulting film was scanned at 20° C./min. in a Perkin-Elmer DSC-2 scanning calorimeter under nitrogen from 30 to 200° C. To minimize the effect of thermal stresses on the $T_g$ measurement, the reported data is the result of the scan obtained after quenching from 200° C.

The S/AN/DMSP terpolymer of Example 10 containing 19.9 wt % of acrylonitrile and 14.2 wt % of DMSP was solution blended with a series of SAN copolymers of varying AN contents and similar molecular weights (Mw/Mn about 100,000/50,000), solvent cast, dried, annealed and tested. Similarly, the S/AN/DMSP terpolymer of Example 12 was blended with V-811, a polymethylmethacrylate (PMMA) obtained from Rohm and Haas Company (Philadelphia, Pa.), solvent cast, dried, annealed and tested.

The properties of the blends are summarized in Table II below. In all cases studied, the 5 wt % casting solution in

TABLE II

Examples 9 to 16
Blends of SAN and S/AN/DMSP

| Example | % An* | Film | Tg° C. | Miscible |
|---|---|---|---|---|
| 9** | 0 | cloudy | 105/116 | No |
| 10 | 5 | cloudy | 107/117 | No |
| 11 | 10 | cloudy | 107/117 | No |
| 12 | 18 | clear | 107/113 | No |
| 13 | 25 | clear | 108 | Yes |
| 14 | 28 | clear | 107 | Yes |
| 15 | 32 | clear | 107 | Yes |
| 16*** | 0 | clear | 108 | Yes |

*Weight % of AN in the SAN
**Polystyrene was used as a control
***PMMA used instead of SAN in Example 16

The data in Table II is presented graphically in the drawing. Referring to the drawing, when the amount of AN in the SAN copolymer is in the range of from 0 to 18 weight percent, based on the total weight of the SAN, the blends of SAN and S/AN/DMSP are not miscible as is evidenced by the cloudy film appearance and the two (2) Tg values. However, in the examples shown, at about 20 weight percent of AN, a clear film and a single Tg is obtained indicating that the blends are miscible.

These miscible blends may be used as is or added to conventional ABS, MBS, ASA, ASEPDM polymers.

I claim:

1. A polymer composition comprising from 1 to 99 weight percent of a first polymer which comprises:
   a) from about 40 to 84 weight percent of a vinyl aromatic monomer;
   b) from about 15 to 35 weight percent of an unsaturated nitrile monomer; and
   c) from about 1 to 25 weight percent of a dialkylvinyl aromatic phosphonate; and from 99 to 1 weight percent of a second polymer selected from the group consisting of (i) polymers of a vinyl aromatic monomer and an unsaturated nitrile monomer; (ii) polymers and copolymers of methylmethacrylate; and (iii) mixtures thereof. Wherein the polymer composition is characterized by having a single glass transition temperature ($T_g$).

2. A polymer composition as in claim 1 wherein the second polymer is a styrene acrylonitrile polymer and the phosphonate polymer is based on DMSP.

3. A polymer composition as in claim 1 wherein the second polymer is polymethylmethacrylate and the phosphonate polymer is based on DMSP.

4. A polymer composition as in claim 1 wherein the second polymer is a copolymer of methylmethacrylate.

5. A polymer composition as in claim 1 which further contains a rubber modified polymer.

6. A polymer composition as in claim 5 wherein the rubber modified polymer is selected from the group consisting of methylacrylate-butadiene-styrene polymers (MBS), acrylonitrile-butadiene-styrene polymers (ABS), acrylonitrile-styrene-acrylate rubber polymers (ASA), acrylonitrile-styrene-ethylene propylene diene monomer polymers (EPDM-g-SAN) and mixtures thereof.

7. A polymer of a vinyl aromatic monomer, an unsaturated nitrile monomer and dimethylstyrene phosphonate.

8. A polymer as in claim 7 which comprises:

a) from about 40 to 84 weight percent of a vinyl aromatic monomer;

b) from about 15 to 35 weight percent of an unsaturated nitrile monomer; and c) from about 1 to 25 weight percent of a dimethylstyrene phosphonate.

9. A polymer as in claim 8 wherein the aromatic monomer is a styrene monomer.

10. A polymer as in claim 8 wherein the unsaturated nitrile monomer is acrylonitrile or methacrylonitrile.

* * * * *